United States Patent [19]
Mukai

[11] Patent Number: 5,825,114
[45] Date of Patent: *Oct. 20, 1998

[54] BRUSH AND SLIP RING ARRANGEMENT OF AN AC GENERATOR

[75] Inventor: Takuzou Mukai, Handa, Japan

[73] Assignee: Denso Corporation, Kariya, Japan

[*] Notice: The term of this patent shall not extend beyond the expiration date of Pat. No. 5,242,511.

[21] Appl. No.: 748,829

[22] Filed: Nov. 15, 1996

[30] Foreign Application Priority Data

Nov. 17, 1995 [JP] Japan ..................................... 7-299392

[51] Int. Cl.⁶ ................................................... H02K 13/00
[52] U.S. Cl. .......................... 310/251; 310/242; 310/245; 310/248
[58] Field of Search ..................................... 310/251, 232, 310/231, 245, 246, 242, 239, 248

[56] References Cited

U.S. PATENT DOCUMENTS

| | | | |
|---|---|---|---|
| 3,996,408 | 12/1976 | Fridman et al. ......................... | 428/408 |
| 4,000,430 | 12/1976 | Bely et al. ............................... | 310/251 |
| 4,349,384 | 9/1982 | Weinhart ................................. | 75/208 R |
| 4,447,752 | 5/1984 | Boyce et al. ............................ | 310/232 |
| 4,574,215 | 3/1986 | Mabuchi .................................. | 310/239 |
| 5,227,689 | 7/1993 | Shibuya .................................. | 310/252 |
| 5,242,511 | 9/1993 | Yokoyama et al. ...................... | 148/430 |
| 5,270,605 | 12/1993 | Lefrancois et al. ..................... | 310/263 |
| 5,304,417 | 4/1994 | Zurecki et al. .......................... | 428/336 |
| 5,584,975 | 12/1996 | Pohto et al. ............................. | 204/288 |

FOREIGN PATENT DOCUMENTS

| | | |
|---|---|---|
| 0 165 515 A2 | 12/1985 | European Pat. Off. . |
| 0 599 572 A1 | 6/1994 | European Pat. Off. . |
| 0 762 607 A2 | 3/1997 | European Pat. Off. . |
| 26 57 226 A1 | 6/1977 | Germany . |
| 60-204243 | 10/1985 | Japan . |
| 2 099 230 | 12/1982 | United Kingdom . |

OTHER PUBLICATIONS

Patent Abstracts of Japan, Publication No. 57–148559, Sep. 13, 1982, Yasuki, "Miniature Commutator Motor".

*Primary Examiner*—Thomas M. Dougherty
*Assistant Examiner*—Tran N. Nguyen
*Attorney, Agent, or Firm*—Cushman Darby & Cushman, IP Group of Pillsbury Madison & Sutro LLP

[57] ABSTRACT

A resilient thin sheet is used for a brush instead of a conventional brush unit which includes coil springs, pig tails and graphite brushes. A slip ring is made of perforated copper which is impregnated with carbon powder. The brush has two arc-shaped arms extending along the circumference of the slip ring and contacting portions disposed at the edges of the arms which are in contact with the peripheral surfaces of the slip ring. Wear resistant members are welded or caulked to the contacting portions to prevent excessive wear of the brush, thereby increasing the life of the brush.

7 Claims, 8 Drawing Sheets

5,825,114

BRUSH AND SLIP RING ARRANGEMENT OF AN AC GENERATOR

BACKGROUND OF THE INVENTION

1. Field of the Invention

The present invention relates to an AC generator, particularly an AC generator for a vehicle.

2. Description of the Related Art

In general, a vehicular alternator has a rectifier, a voltage regulator, a shaft rotatably supported by a housing, a stator, a rotor, a slip ring unit carried by an end of the shaft and a brush unit sliding on the outer periphery of the slip ring unit.

The slip ring unit is composed of two slip rings and two connection bars. The two slip rings are made of a copper alloy or stainless steel. The two connection bars are connected to opposite coil ends of the rotor coil and to the two slip rings. In order to prevent resonant vibration of the portions connecting the coil ends and the connection bars and the portions connecting the slip rings and the connection bars due to vehicle vibration or rotational change in the vehicular generator, such connecting portions are covered with an insulating resinous layer.

The brush unit is composed of two brushes, a brush holder and coil springs which bias the two brushes against the outer periphery of the slip rings. The brushes are made of graphite or carbonaceous material. The brushes are connected to the voltage regulator through brush terminals through copper pig tails.

However, the brushes require an extra-length to accomodate wearing. Accordingly, the axial size of the brush holder can not be reduced, thus creating an obstacle to making a compact vehicular alternator.

In a small DC rotary electric machine, metal brushes are made from laminated metal sheets or copper wires and a commutator is made of a copper alloy. However, the commutator is worn away easily.

SUMMARY OF THE INVENTION

The object of the invention is to provide a long-life generator which has lighter brushes to thereby reduce the spring force necessary to restrain vibration of the brushes. Another object of the invention is to provide a generator which has wear-resistant member on the surface of the brushes in contact with the slip rings, thereby preventing excessive wear of the brushes.

According to a main feature of the invention, a brush is made of a metal member. Therefore, a portion of the brush in contact with the outer periphery of the slip ring has little electric resistance so that the contacting surface can be made small without excessive temperature rise in the brush.

A wear-resistant member disposed between the brush and the slip ring make the brushes more wear-resistant. Therefore, it is not necessary to have extra size and length to accomodate for wear as in a conventional brush. Thus, the present invention permits the use of thin, light-weight and compact brushes.

According to another feature of the invention, the surface of the brush in contact with the slip ring is covered with a wear-resistant contact member made of copper or silver alloy. Therefore, wear-resistance is increased and wear of the contact surface of the brush is drastically reduced.

According to another feature of the invention, a wear-resistant contact-member made of copper or silver alloy is brazed, rivetted or caulked to the portion of the brush in contact with the slip ring. Therefore, wear rate of the brush is drastically reduced.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

[first Embodiment]

A first embodiment of the invention is described with reference to FIGS. 1 to 5.

Figure 2:
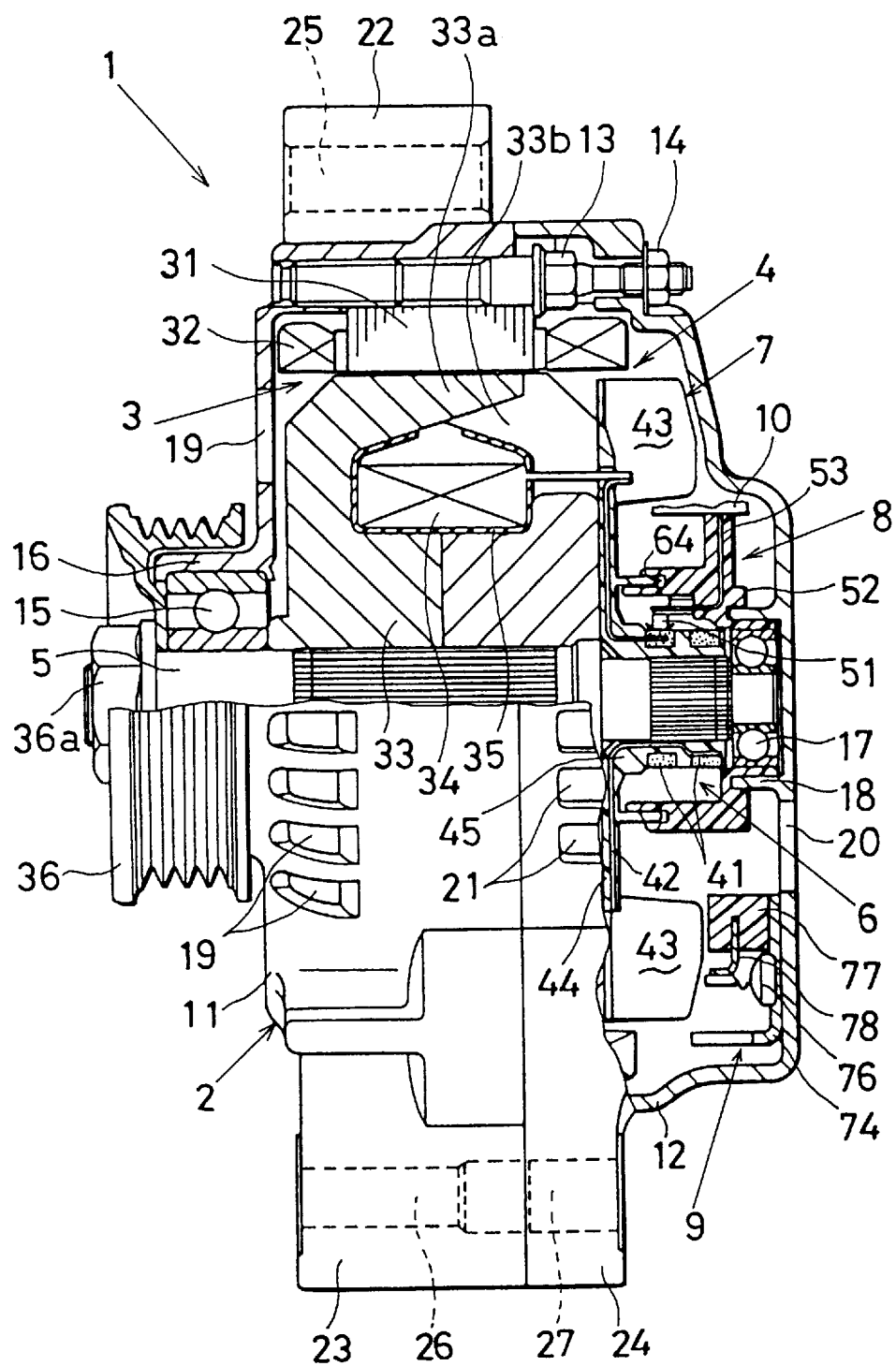
FIG. 2 is a cross-sectional view illustrating a vehicular alternator according to the first embodiment of the present invention.

In FIG. 2, an alternator 1 for a vehicle is driven by an engine through a poly-V belt (not shown). AC voltage generated by the alternator is converted by a three-phase full-wave rectifier 9 to DC current to charge a battery (not shown) and to energize electric loads (not shown). The alternator 1 is composed of a housing 2, a stator 3, a rotor 4, the slip ring unit 6, a fan unit 7, a brush unit 8, the rectifier 9 and a voltage regulator 10.

The housing 2 is composed of two aluminum die-casts, that is a front housing 11 and a rear housing 12, and fastened by a plurality of stud bolts 13 and nuts 14.

The front housing 11 has a front bearing 15 press-fitted into a bearing support 16 for rotatably carrying the front-end of the shaft 5. The rear housing 12 has a rear bearing 17 press-fitted to a bearing support 18 for rotatably supporting the rear end of the shaft 5, through a brush support 52 which is described later. Air-intake windows 19 and 20 are formed angularly in the front and rear housings 11 and 20.

A stay 22 is formed integrally with an upper portion of the front housing 11 and stays 23 and 24 are formed integrally with a lower portion thereof to be fixed to a bracket (not shown) of the engine. These stays 22–24 have through holes 25–27 for bolts.

The stator 3 is composed of a stator core 31 secured to the inner periphery of the front housing 11 and three-phase stator winding 32 wound in the stator core 31.

The stator core 31 is composed of laminated sheets of a magnetic material. The stator core 31 has numbers of slots (not shown) formed at even intervals in the inner periphery thereof.

The three-phase stator winding 32 has a plurality of coils connected into the Y-connection or the Δ-connection to generate three-phase AC output power as the rotor 4 rotates. The coil ends of the stator winding 32 are soldered and connected to the three-phase full-wave rectifying bridge-circuit of the rectifier 9.

The rotor 4 provides the magnetic field and rotates together with the shaft 5. The rotor 4 is composed of the shaft 5, Lundell type pole cores 33 carried by the shaft 5, a field coil 34 wound in the pole cores 33, the slip ring unit 6 for supplying the field current to the field coil 34 and the fan unit 7.

The pole core 33 has a field coil 34 wound around the center thereof and made of a ferromagnetic material. The pole core 33 has front claw poles 33a which become N-pole and rear claw poles 33b which become S-pole when the field current is supplied to the field coil 34. The cooling fan unit 7 is fixed to the rear surface of the claw poles 36 by welding or the like to take cooling air inside the housing 2.

The field coil 34 is wound around the central portion of the pole core 33 via a coil bobbin 35 and magnetizes the pole core 33 when the field current is supplied. The field coil 34 has opposite ends connected to connection bars 42 by soldering or the like. The coil bobbin 35 is made of an insulating resinous material to insulate the field coil 34 from the pole cores 33.

The shaft 5 is rotatably carried by boss portions 16 and 18 of the housing 2 via the front and rear bearings 15 and 17. A V-ribbed pulley 36 is fastened to an end of the shaft 5 between a washer-faced nut 36a and the front bearing 15 to transmit the engine rotational torque to the shaft 5. The V-ribbed pulley 36 is driven by a pulley for the poly V-belt carried by the engine crank shaft through a poly V-belt (not shown). A magnetic clutch can be disposed between the shaft 5 and the V-ribbed pulley 36.

The slip ring unit 6 is composed of two slip rings 41 which connect the battery, the voltage regulator 10 and the field coil 34 through the brush unit 8 and two connection bars 42 connected to the slip rings 41.

Each of the slip rings 41 is disposed on the outer periphery of the rear portion of the shaft 5. The slip rings 41 are made of a carbonaceous member such as perforated copper alloy impregnated with carbon powder, natural graphite electric graphite or metal graphite. The slip rings 41 are molded together with the connection bar 42 into a cylindrical shape. One of the two slip rings 41 is a plus-side slip ring and the other is a minus-side slip ring.

The two connection bars 42 are press-formed into a pair of plates, whose one ends are connected to the coil ends of the field coil 34a by soldering, brazing or fusing (resistance-welding). The other ends of the two connection bars 42 are electrically connected to the slip rings respectively. In order to increase the contacting surface of the slip rings 41 and the connection bars or to reduce the contact resistance therebetween, the surface of the two connection bars 42 can be roughened by shot blasting, shot peening, or press forming.

Figure 3:
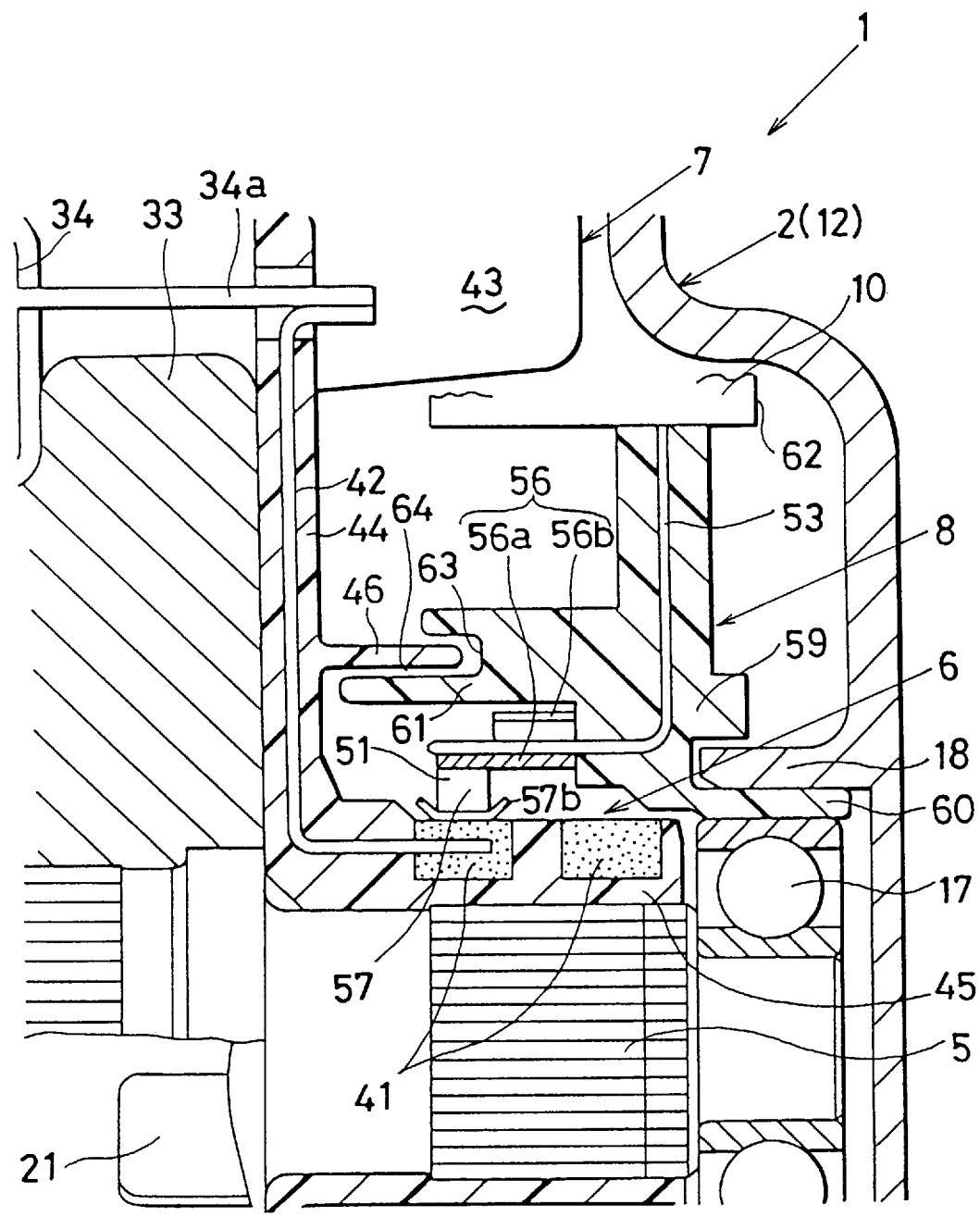
FIG. 3 is an enlarged partial cross-sectional view illustrating a main portion of the vehicular alternator according to the first embodiment.
Figure 4:
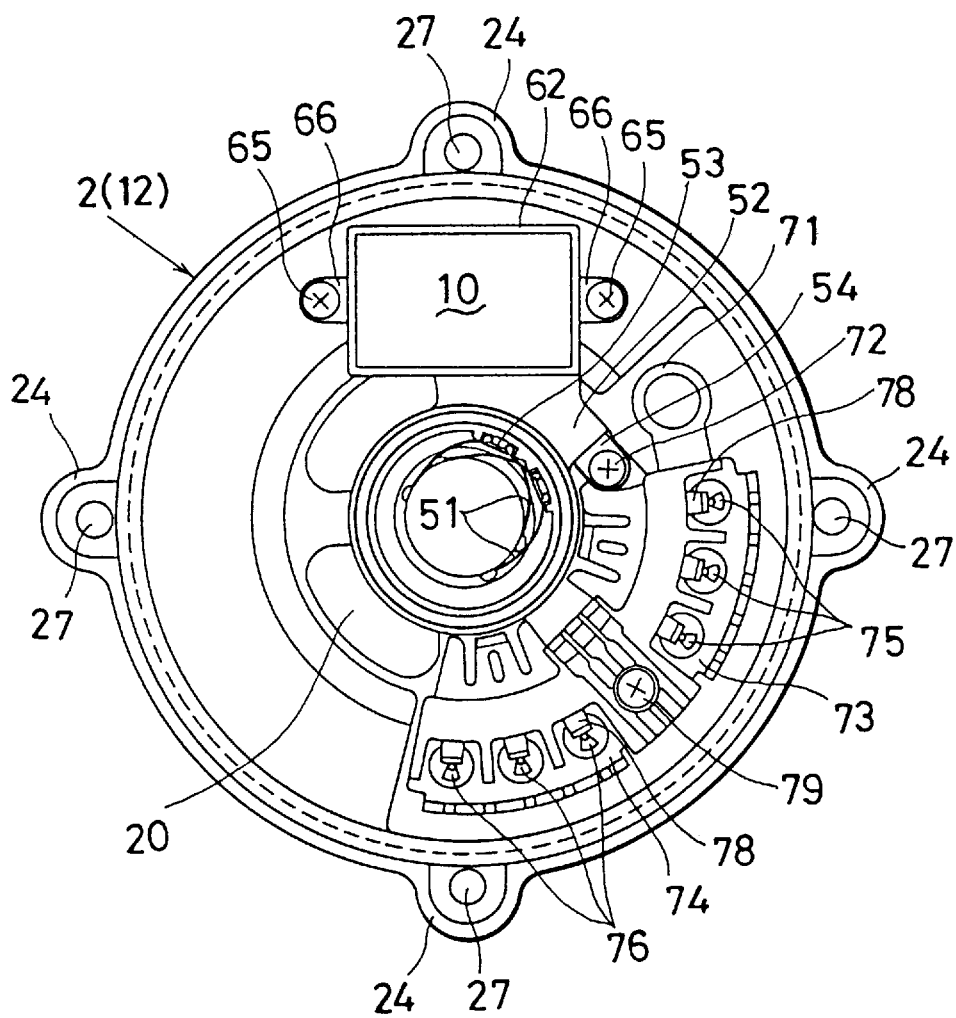
FIG. 4 is an end view illustrating a rectifier, a voltage regulator and a brush unit disposed in the rear housing of the alternator according to the first embodiment.

The fan unit 7 is described with reference to FIGS. 2 and 3. The fan unit 7 is formed of an insulating resinous material in a mold unit integral with the slip rings 41 and the connection bars 42 and protects the connecting portions of the slip rings 41 and the connection bars 42. The fan unit 7 is composed of a plurality of centrifugal blades 43, a blade supporting portion 44 and a cylindrical ring support 45 which is integral with the slip rings 41 by insert-molding. The supporting portion 44 is fixed to the rear wall of the pole core 33 and provided with a projecting portion 46 to face the brush unit 8 at the rear surface thereof.

The ring support 45 is formed in a mold unit of an insulating material integral with the slip rings 41 and connection bars 42 and is press-fitted to the outer periphery of the rear end of the shaft 5. The insulating resinous material is a material having high insulating performance, high heat resistivity, high strength and high dimensional stability such as polyphenylene sulfide (PPS) or phenol resin (PM resin).

The brush unit 8 is composed of the two brushes 51 sliding on the outer periphery of the two slip rings 41, a brush holder 52 and the connecting terminals 53 and 54 inserted in the mold portion of the brush holder 52.

The brushes 51 are made by press-forming or stamping a sheet of metal (e. g. springy copper alloy such as phosphor bronze or beryllium). Each of the brushes 51 has a brush body 55 at the center thereof, a clamp portion 56 extending from the brush body 55 toward the brush holder 52 and two arm portions 57 extending circumferentially around the slip rings 41 from the opposite sides of the brush body 55.

The clamp portion 56, which is springy, is electrically and mechanically fixed to the connecting terminals 53 and 54. The clamp portion 56 has a projection 56a axially extending from the brush body 55 and two clamp members 56b which are curled to form an elliptic cylinder having resilience. The clamp portion 56 holds each edge portion of the connecting terminals 53 and 54 by the projection 56a and the clamp members 56b. The connecting terminals 53 and 54 and the clamp portion 56 can be connected by welding, caulking or the like.

The arm portions 57 have contacting portions 57a sliding on the slip rings 41 at the edge thereof. They apply a certain pressure on the slip rings 41 by their own resilience. Two projections 57b extend in the axial direction from opposite axial ends of each of the contacting portions 57a and are bent radially outward by from the contacting portions 57a (chamfered).

Rectangular wear-resistant contact members (hereinafter referred to as wear resistant member) 58 are welded to the contacting surfaces of the contacting portions 57a respectively. Each of the wear resistant members 58 is made of a metal alloy including copper or silver which has a good electric conductivity (e. g. silver-palladium alloy indicated as CP13A–CP13D in Table 1 or silver-copper alloy indicated as CP6A–CP6C in Table 2).

TABLE 1

|  | Ag | Pd |
| --- | --- | --- |
| CP13A | 40% | 60% |
| CP13B | 50% | 50% |
| CP13C | 70% | 30% |
| CP13D | 80% | 20% |

TABLE 2

|  | Ag | Cu |
| --- | --- | --- |
| CP6A | 95% | 5% |
| CP6B | 90% | 10% |
| CP6C | 60% | 40% |

Figure 5:
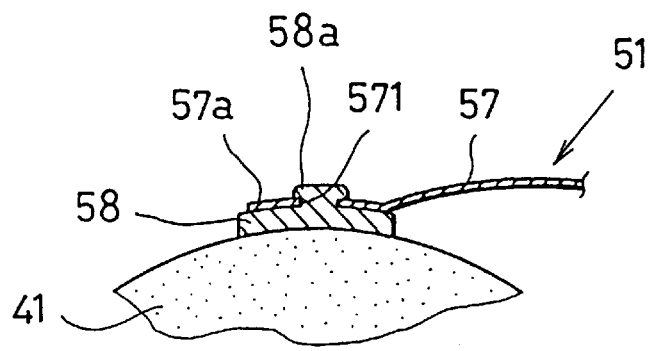
FIG. 5 is an enlarged partial cross-sectional view illustrating a contacting portion of the brush with the slip ring of the alternator according to the first embodiment.

The wear resistant member 58 is provided with a projection 58a, which is inserted into a hole 571 of the arm portion 57 and caulked to connect to the arm portion 57 electrically and mechanically as shown in FIG. 5. Because the brushes 51 are made of a metal member and the wear resistant member 58 is fixed to the contacting portions 57a in contact with the slip rings 41, the brushes 51 become resistant to wear and the extra size and length are not necessary as the conventional carbon brushes. As a result, the brushes 511 can be made very thin.

As described above, the contacting portions 57a have chamfered-shape projections 57b so as to move smoothly in the axial direction. Therefore, it is very easy to install or remove the brushes 51 on or from the outer periphery of the slip rings 41. Thus, the productivity of the vehicular alternator 1 is improved and the cost thereof is reduced.

Each of the arm portions 57 is formed into an arc shape (horseshoe shape) so that it is biased against the two slip rings 41 by the shrink due to the difference (B–A) between the distance (distance between the two wear resistant members 58) A and the diameter B of the slip ring. Therefore, the composite vector of the contact pressures of the brushes 51 applied to the outer periphery of the slip rings 41 becomes zero so that no contact pressure is applied to the clamp portion 56 which is mechanically fixed to the connecting terminals 53 and 54. If excessive vibration is generated in a direction where the two arm portions 57 of the brushes 51 separate from the slip rings 41, that is, the radial direction of the slip rings 41, the separating contacting portions 57a and the staying contacting portion 57a assure the electric connection of the brushes 51 and the slip rings 41, thereby supplying stable field current to the field coil 34.

Because the brushes 51 made of a metal reduces the electric resistance of the contacting portions 57a of the brushes 51 in contact with the outer periphery of the slip rings 41, the electric current density of the contacting portions 57a (wear-resistant members 58) of the brushes 51 does not change even if the surface area of the contacting portions 57a is reduced. Therefore, temperature rise of the brushes 51 is suppressed and thus the life time thereof is increased.

Although, the slip rings 41 are made of carbonaceous material, the temperature rise of the slip rings 41 is suppressed and the life time thereof is increased because a portion of the annular slip rings 41 in contact with the brushes 51 is limited to a small part of the circumference surface thereof.

Because the slip rings 41 are made of a carbonaceous material, the brushes 51 can be made of a metal member so as to slide on the outer periphery of the carbonaceous rings 41 at a high speed (e.g. no lower than 10,000 rpm), ensuring stable wear and electric power supply to the field coil 34.

The brush holder unit 52 is made of insulating resinous material (e.g. PPS). The brush holder unit 52 has an integral mold unit of a brush holder 59, a cylindrical bearing support 60 disposed inside the brush holder 59, a cylindrical extension 61 extending axially from the front portion of the brush holder 59 and a casing 62 of the voltage regulator 10 which is described later.

The brush holder 59 is molded integrally with the connecting terminals 53 and 54. The bearing support 60 is press-fitted to the inner periphery of the boss 18 of the rear housing 12, and the rear bearing 17 is press-fitted thereto.

The extension 61 or a slip ring cover encloses the two slip rings 41, the two brushes 51 and their interfaces. The extension 61 is provided with a groove 63 on the surface facing the supporting portion 44 to receive the projecting portion 46. As a result, the groove 63 of the brush holder unit 52 is provided with a U-shaped labyrinth portion 64 between the supporting portion and the groove 63. The labyrinth portion 64 is formed into a continuous ring. Accordingly, the cylindrical space in which the slip rings 41 and the brushes 51 are accommodated is sealed by the fan unit 7 and the brush holder unit 52.

The connecting terminal 53 has a L-shaped cross-section and is formed integrally with a field current output terminal (not shown) of the voltage regulator 10. The connecting terminal 54 is an outer terminal of the brush unit 8 and has an inverted L-shaped cross-section so as to extend in the direction opposite to the connecting terminal 53. It is fastened to a DC output terminal 71 of the rectifier 9 by a fixing screw 72 for the electrical connection.

Figure 1:
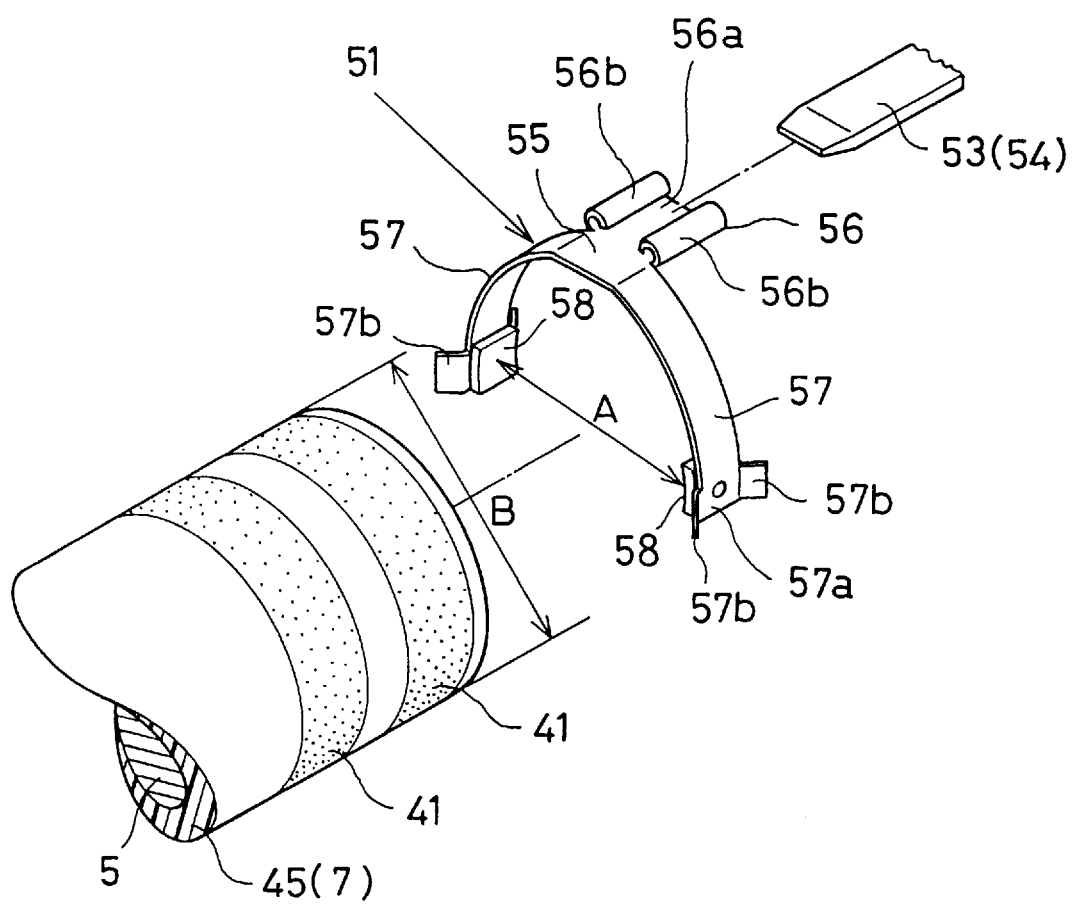
FIG. 1 is an exploded, partial perspective view illustrating slip rings and a brush according to a first embodiment of the present invention.

The edge portions of the connecting terminals 53 and 54 are formed tapered as shown in FIG. 1 so that they are inserted into a space between the projection 56a of the clamp portion 56 and clamp members 56b. The terminals 53 and 54 are made of a metal such as an aluminum alloy or a copper alloy.

The rectifier 9 is composed of the DC output terminal 71, plus-side cooling fin 73, minus-side cooling fin 74, three-plus-side diodes 75, three minus-side diodes 76 and a terminal support 77.

The DC output terminal 71 has one end connected to the plus-terminal of a battery through an electric wire (not shown) and the other end fastened by fixing screws (not shown) to the connecting terminal 54 of the brush unit 8 and the plus-side cooling fin 73 to be electrically connected thereto. The DC output terminal 71 supplies charging current to the battery and composes a B-terminal of the vehicular alternator 1.

The plus-side cooling fin 73 is formed integrally with the minus-side cooling fin 74 so that they surround the brush holder 52 and is disposed along the side wall of the rear housing 12. The plus-side cooling fin 73 is fixed to the inner side wall of the rear housing 12 via an insulating member (not shown). The minus-side cooling fin 74 is chassis-grounded through the rear housing 12. That is, the plus-side cooling fin 73 is connected to the plus-side terminal of the battery, and the minus-side cooling fin 74 is connected to the minus-side terminal of the battery. The plus-side and minus-side cooling fins 55 and 56 are made of conductive metal which is excellent in the heat conduction (such as aluminum), and are heat radiation fins for the three plus-side and the three minus-side diodes 75 and 58 as well as diode-holding members for holding the three plus-side and the three minus-side diodes 75 and 58 respectively.

The plus-side and minus-side diodes 75 and 76 convert the AC output current generated by the three-phase stator winding 32 to a DC current. Each one end of the plus-side minus-side diodes 75 and 76 is soldered to one of three AC input terminals 78, and each the other end thereof is soldered to the plus-side and minus-side cooling fins 73 and 74. The three-phase full-wave rectifying circuit is composed of the DC output terminal 71, the plus-side and minus-side cooling fins 73 and 74, the three plus side, three minus side diodes 75 and 76 and the three AC input terminals 78.

The terminal support 77, which is made of an insulating resinous material (e.g. PPS), accommodates the three AC input terminals 78 therein and insulates the plus-side cooling fin 73 from the minus-side cooling fin 74. The terminal support 77 holds therein the plus-side cooling fin 73 and the minus side cooling fin 74 by a screw 79.

The voltage regulator 10 is composed of various output terminals including the field current output terminals (not shown), an integrated circuit (not shown) and a casing 62. The field current output terminals are made of copper alloy or the like and are integral with the connecting terminal 53 and mechanically connected to the brushes 51.

The integrated circuit is a voltage regulator for regulating the output voltage of the three-phase stator winding 32. The integrated circuit includes a power transistor which is a switching element for controlling the supply of the current to the field coil 34 and a diode for absorbing the counter electromotive force which reduces the field current. The casing 62 is made of an insulating resinous material (e.g. PPS) and has a plurality of brackets 66 fixed to the rear housing 12 by bolts 65. The casing 62 holds the brush holder unit 52, two brushes 51 in the rear housing and accommodates electric parts including an integrated circuit therein, which is molded with an epoxy resin.

The operation of the vehicular alternator 1 is described with reference to FIG. 1 to FIG. 4 briefly.

When an engine mounted in a vehicle is started, the engine rotation is transmitted by a transmitting member such as a poly-V belt to the V-ribbed pulley 36. Then, the shaft 5 rotatably carried by the housing 2 via the bearings 15 and 17 is rotated, and the rotor is rotated. The pole core 33, the field coil 34 and the two slip rings 41 rotate together with the shaft 5.

When the voltage regulator 10 starts to supply the field coil 34 with current, the field current flows from the battery through the DC terminal 71, connecting terminal 54, two wear-resistant members 58, plus-side slip ring 41, plus-side connection bar 42, field coil 34, minus-side connection bar 42, minus-side slip ring 41, two wear-resistant member 58, minus-side brush 51, connecting terminal 53, voltage regulator 10, rear housing 12 and the body. As a result, the two claw poles 33*a* and 33*b* are magnetized by the field coil 34 so that all the front claw poles 33*a* become N-pole and all the rear claw poles 36 become S pole.

Then, the three-phase stator winding 32 generates AC voltage instantly. The three-phase current are supplied to the three-phase rectifying circuit through the AC input terminal 60 so that the three-phase AC current is converted to DC current by the three plus-side diodes 75 and the three minus-side diodes 76. When the output voltage of the stator winding 32 exceeds a battery voltage, the rectified DC current or charging current is supplied from the three plus-side diodes 75, through the plus-side cooling fin 73, the DC output terminal 71 and the electric wire to the battery. Thus, the battery is charged and electric loads are energized.

As stated above, if the vehicular alternator 1 is operated for a long time, the slip rings 41 and the wear-resistant members 58 of the brushes 51 move at a high speed relative to and in contact with each other. Since the slip rings 41 are self-lubricated and have a reduced coefficient of friction, the wear rate is much smaller than that of the conventional copper alloy slip rings.

The resistivity of the vibration is generally expressed as follows according to a machine design book.

Resistivity of Vibration∝{(k×spring load)/(weight of stator-side brushes)}+{weight of spring}  [Eq. 1]

Therefore, if the weight of the stator-side brushes is reduced, the spring load of the brushes can be reduced.

Because of the wear-resistant member 58 of the contacting portions 57*a* of the two arm portions 57 of the brushes 51, the wear rate of the slip rings 41 and the brushes 51 can be drastically reduced. For instance, the wear rate of the brushes 51 according to the present invention is about $\frac{1}{10}$ of the conventional brushes stated before. That is, the suppression of the vibration of the brushes 51 increases the life time of the brushes and the vehicular alternator 1.

[Second Embodiment]

Figure 6:
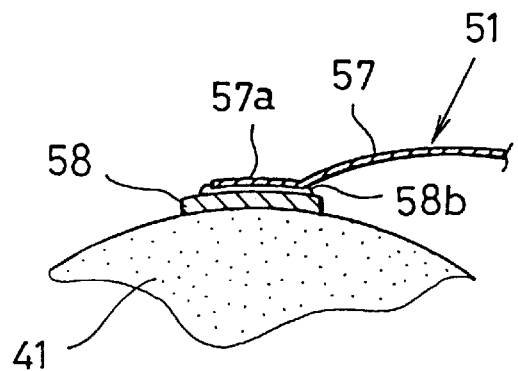
FIG. 6 is an enlarged partial cross-sectional view illustrating the contacting portion of the brush with the slip ring of the alternator according to a second embodiment of the present invention.

FIG. 6 illustrates a contacting portion of the brush and the slip ring according to a second embodiment of the present invention.

In this embodiment, the wear-resistant members 58 are brazed to the contacting portions 57*a* of the arm portions 57 of the brushes 51 by a brazing material 58*b*. The wear-resistant member 58 can be soldered to the contacting portions 57*a*. The wear-resistant member 58 can be fixed to the contacting portions 57*a* by projection-welding.

[Third Embodiment]

Figure 7:
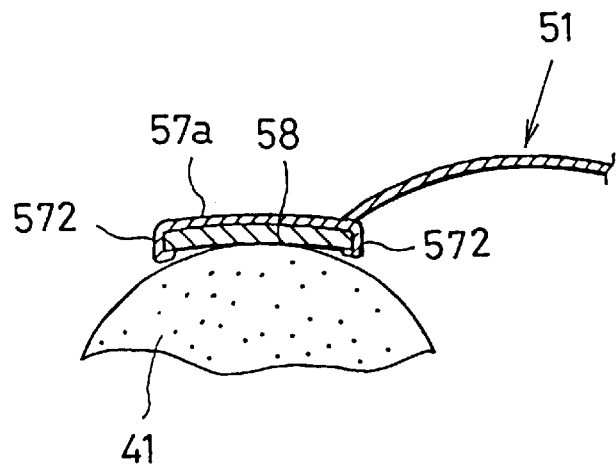
FIG. 7 is an enlarged partial cross-sectional view illustrating the contacting portion of the brush with the slip ring of the alternator according to a third embodiment of the present invention.

FIG. 7 illustrates the contacting portion of the brush and the slip ring according to a third embodiment of the present invention.

In this embodiment, the wear-resistant member 58 is connected to the contacting portion 57*a* electrically and mechanically by caulking edges 572 of the contacting portion 57*a* of the arm portion 57 of the brush 51.

[Fourth Embodiment]

Figure 8A:
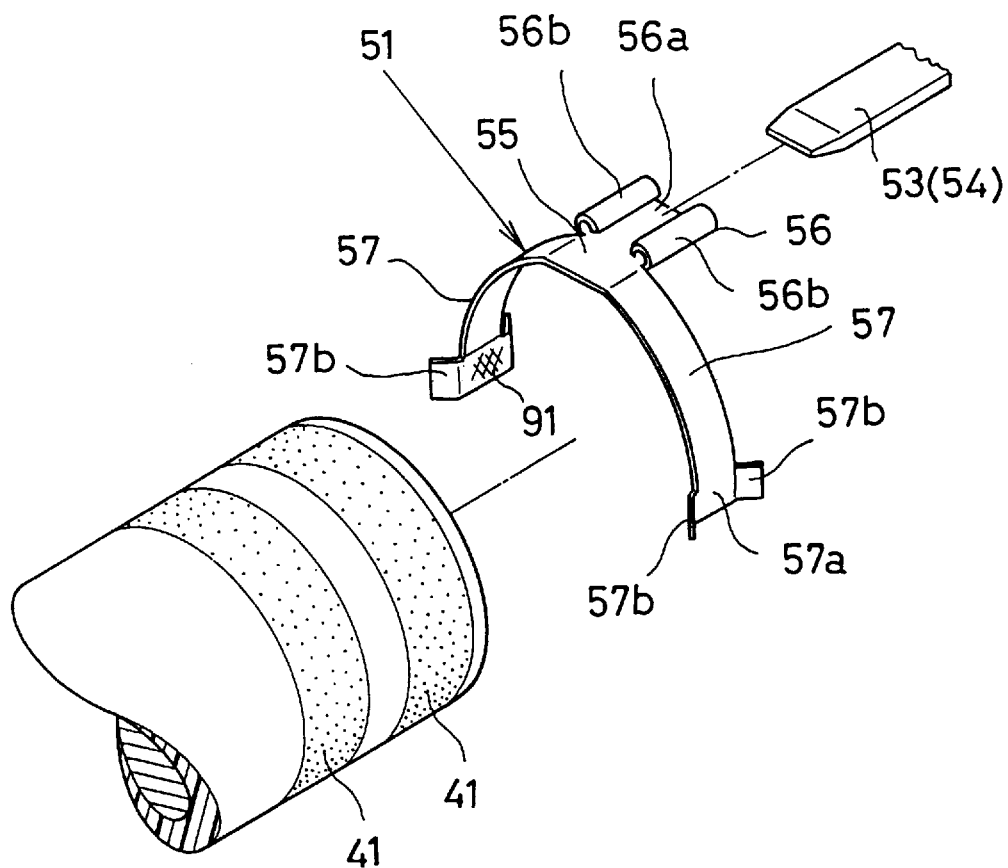
FIG. 8A is an exploded perspective view illustrating the slip ring and brush.
Figure 8B:
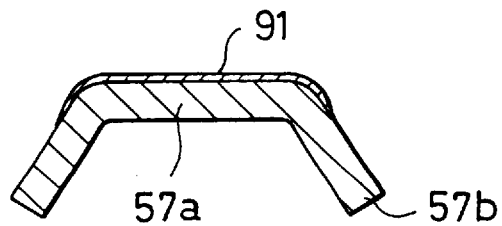
FIG. 8B is an enlarged cross-sectional view illustrating the contacting portion of the brush of the alternator according to a fourth embodiment of the present invention.

A fourth embodiment of the present invention is described with reference to FIG. 8A and FIG. 8B.

In the fourth embodiment, the contacting portion 57*a* of the arm portion 57 of the brush is covered with high-wear-resistant material 91 of a copper or silver alloy by means of PVD (physical vapor deposition) process. The PVD process is a process to cover a contacting portions 57*a* of the brush 51 of a metal alloy with a micro-coat (vacuum deposition or spatter deposition) of a wear-resistant material such as a titanium compound (e. g. TiN, TiC, TiCN or TiAlN) or a chromium compound (e. g. CrN) by a vaporized or ionized metal process.

[Fifth Embodiment]

Figure 9A:
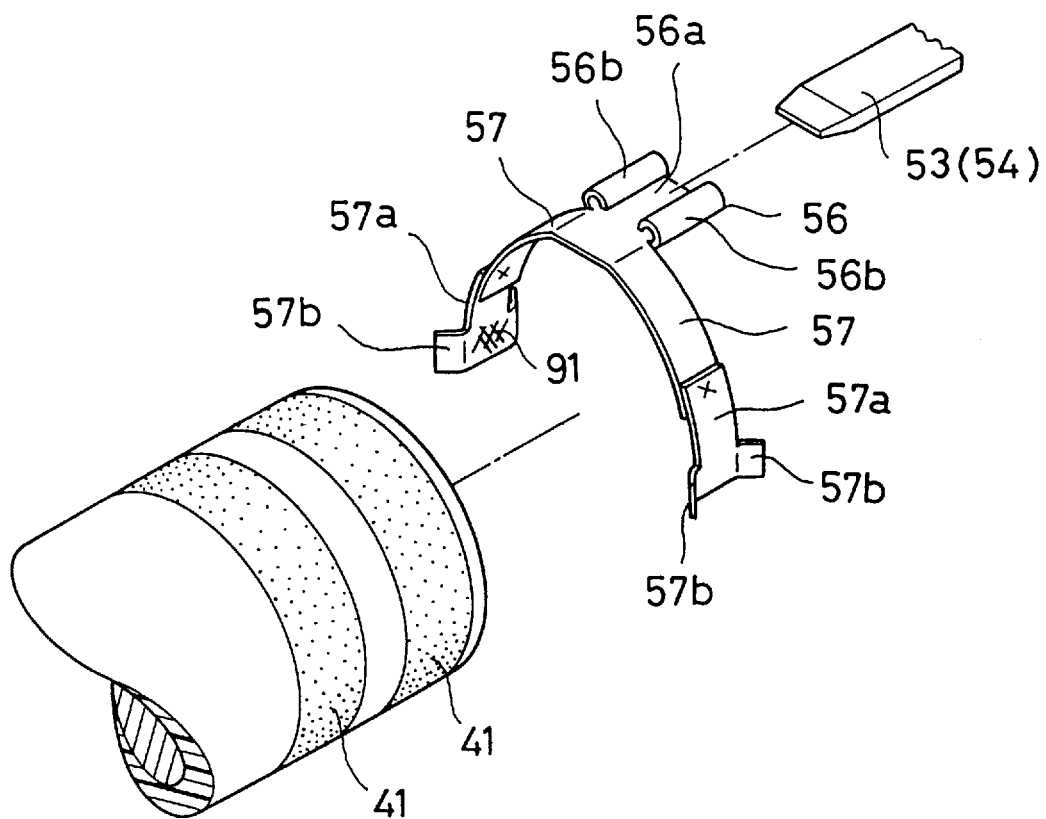
FIG. 9A is an exploded perspective view illustrating the slip ring and brush.
Figure 9B:
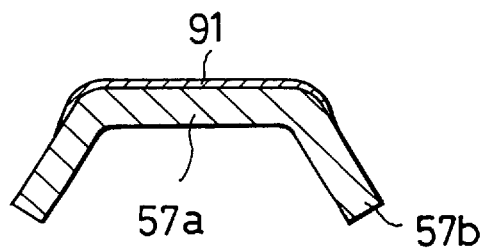
FIG. 9B is an enlarged cross-sectional view illustrating the contacting portion of the brush of the alternator according to a fifth embodiment of the present invention.

A fifth embodiment of the present invention is described with reference to FIG. 9A and FIG. 9B.

In this embodiment, the contacting portions 57*a* of the brush 51 are made separately from the arm portions 57, and they are connected by welding or brazing. Thereafter, the contacting portion 57*a* is covered with a wear-resistant material 91 of a copper or silver alloy by the PVD process to have electrical and mechanical connection.

[Sixth Embodiment]

Figure 10A:
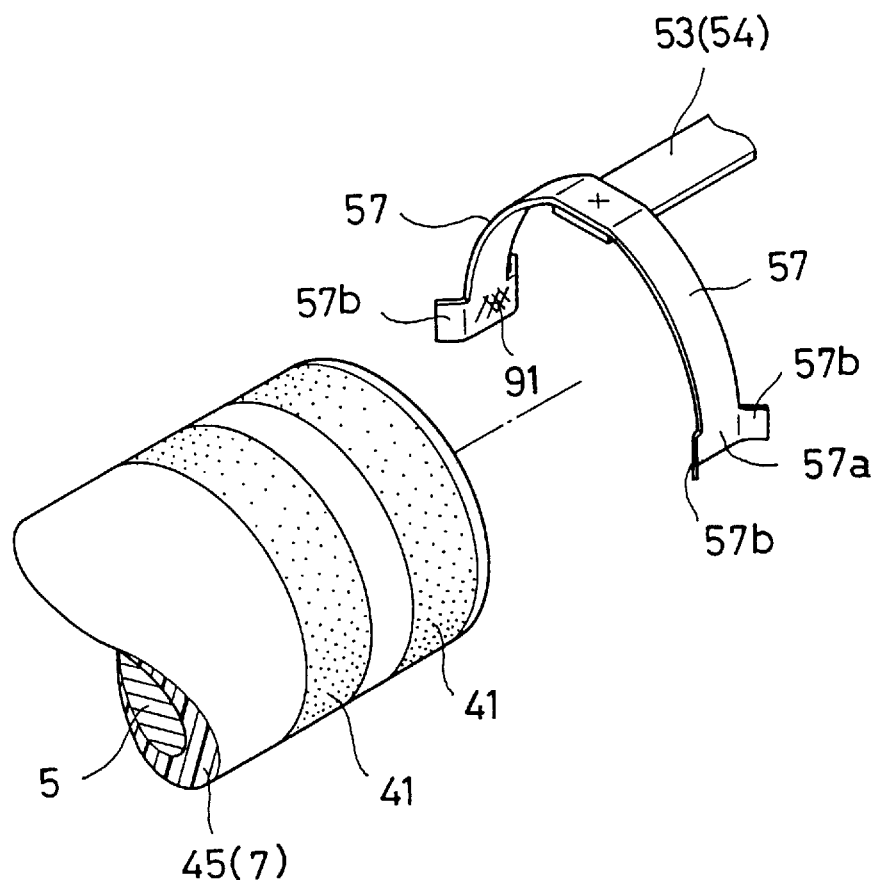
FIG. 10A is an exploded perspective view illustrating the slip ring and brush.
Figure 10B:
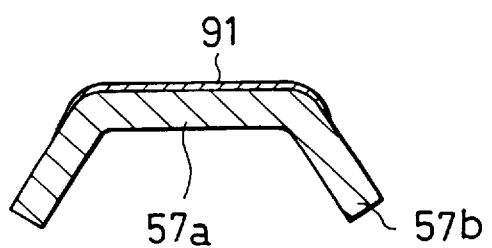
FIG. 10B is an enlarged cross-sectional view illustrating the contacting portion of the brush of the alternator according to a sixth embodiment of the present invention.

A sixth embodiment is described with reference to FIG. 10A and FIG. 10B.

In the sixth, the clamp portion 56 is removed and the connecting terminal 53 (54) and the brush 51 are welded or brazed together. The contacting portions 57*a* of the arm portions 57 of the brush 51 are covered with a wear-resistant material 91 of a copper or silver alloy to have electrical and mechanical connection by means of the PVD process.

[Variation]

Although the description of the above embodiment is made with reference to the vehicular alternator 1, the embodiment can be applied to a stationary AC generator for an electric power station of a building. It can be applied to a generator-motor also.

The pig tails can be formed integrally with the brushes. Separate springs can be disposed in order to bias the brushes also.

The wear-resistant members 58 can be made of a conductive ceramic material.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A brush and slip ring arrangement of an AC generator which includes a housing, a stator having a stator coil, a rotor having a field coil and shaft and a voltage regulator, wherein said arrangement comprises:

a slip ring unit carried by said shaft and having a cylindrical insulating member and a pair of carbonaceous slip rings around said cylindrical insulating member;

a pair of brush members, each of said brush members having a semicircular brush body made of springy copper alloy and disposed to surround one of said slip rings, two contact members disposed at opposite ends of said brush body in contact with one of said slip rings and a clamp portion; and a brush holder fixed to said housing, said brush holder having a pair of connecting terminals each of which engages said clamp portion of one of said brush members and an insulating member insulating said connecting terminals from each other; wherein each of said contact members is made of wear-resistant conductive metal alloy.

2. A brush and slip ring arrangement as claimed in claim 1, wherein each of said contact-members comprises a cover formed of a wear-resistant metal alloy selected from the group including copper alloys and silver alloys, said cover being disposed on a surface of each of said brush members in contact with said slip ring by means of PVD process.

3. A brush and slip ring arrangement as claimed in claim 1, wherein each of said contact-members comprises a rectangular plate made of a wear-resistant metal alloy selected from the group including copper alloys and silver alloys and fixed to each of said brush members to have electrical and mechanical connection.

4. A brush and slip ring arrangement as claimed in claim 1, wherein each of said brush members comprises a press-formed thin-sheet.

5. A brush and slip ring arrangement as claimed in claim 1, wherein each of said brush members comprises a spring member made of a material selected from the group including mainly phosphor bronze or beryllium bronze.

6. A brush and slip ring arrangement as claimed in claim 1, further comprising a voltage regulator, wherein each of said brush members comprises a clamp portion connected electrically and mechanically to said voltage regulator, two semicircular arms extending around each of said slip rings and having contacting portions in contact with an outer periphery of each said slip ring and chamfered projections extending axially from said contacting portions.

7. A brush and slip arrangement as claimed in claim 1, wherein each of said slip rings comprises a carbonaceous ring composed of a mixture of copper powder and carbon powder.

* * * * *